(12) United States Patent
Bakin

(10) Patent No.: US 6,222,632 B1
(45) Date of Patent: Apr. 24, 2001

(54) POLARIZATION INTERFEROMETER SPECTROMETER WITH ROTATABLE BIREFRINGENT ELEMENT

(75) Inventor: Dmitry V. Bakin, San Jose, CA (US)

(73) Assignee: Luxtron Corporation, Santa Clara, CA (US)

( * ) Notice: Subject to any disclaimer, the term of this patent is extended or adjusted under 35 U.S.C. 154(b) by 0 days.

(21) Appl. No.: 09/287,651

(22) Filed: Apr. 7, 1999

(51) Int. Cl.[7] .................................. G01J 3/45; G01B 9/02
(52) U.S. Cl. ............................................ 356/453; 356/455
(58) Field of Search .................................. 356/346, 451, 356/453, 455; 250/339.07

(56) References Cited

U.S. PATENT DOCUMENTS

| 3,849,001 | 11/1974 | Inoue et al. . |
| 4,654,530 | * 3/1987 | Dybwad ............................. 250/347 |
| 4,732,481 | 3/1988 | Matsui et al. . |
| 4,905,169 | 2/1990 | Buican et al. . |
| 5,157,458 | 10/1992 | Wagner et al. . |
| 5,696,582 | 12/1997 | Bärwald et al. . |
| 5,781,293 | 7/1998 | Padgett et al. . |
| 5,883,713 | * 3/1999 | Davis et al. ........................ 356/346 |

OTHER PUBLICATIONS

Born, Max et al., *Principles of Optics (Electromagnetic Theory of Propagation, Interference and Diffraction of Light*, Second (Revised) Edition, The MacMillan Company, New York 1964, Under the sub-heading: "Measurements in Crystal Optics," pp. 690 to 695.

* cited by examiner

*Primary Examiner*—Frank G. Font
*Assistant Examiner*—Phil Natividad
(74) *Attorney, Agent, or Firm*—Skjerven Morrill MacPherson LLP

(57) ABSTRACT

An instrument for determining spectral content of an input light. The instrument has a rotating optical element that separates an input light into two partial beams and thereby introduces a variable OPD between the partial beams. The instrument then records an interferogram as a function of the variable OPD and thereby Fourier or Fast Fourier transforms the interferogram into a spectrogram so that the spectral content of the input light is revealed.

39 Claims, 9 Drawing Sheets

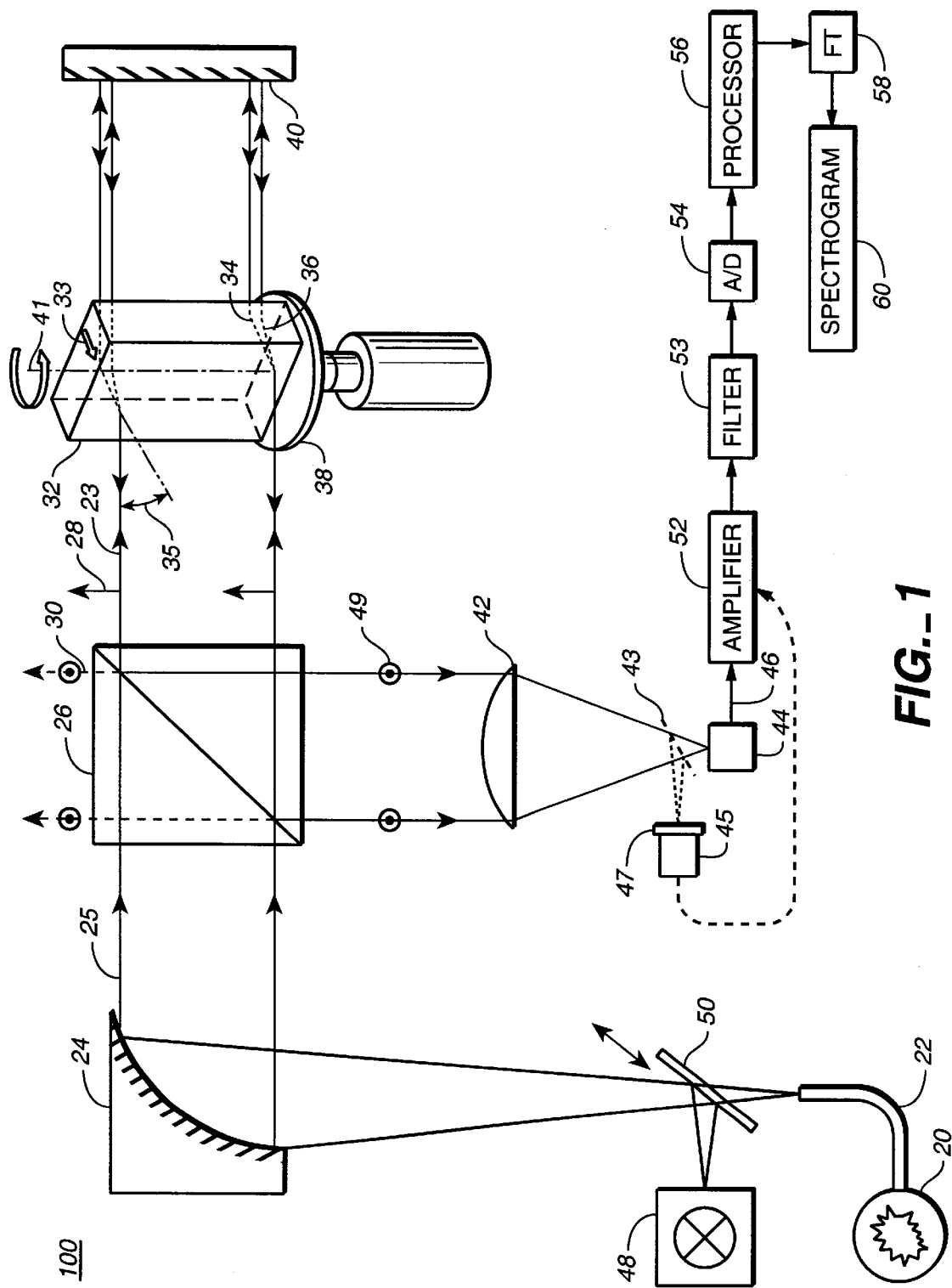
FIG._1

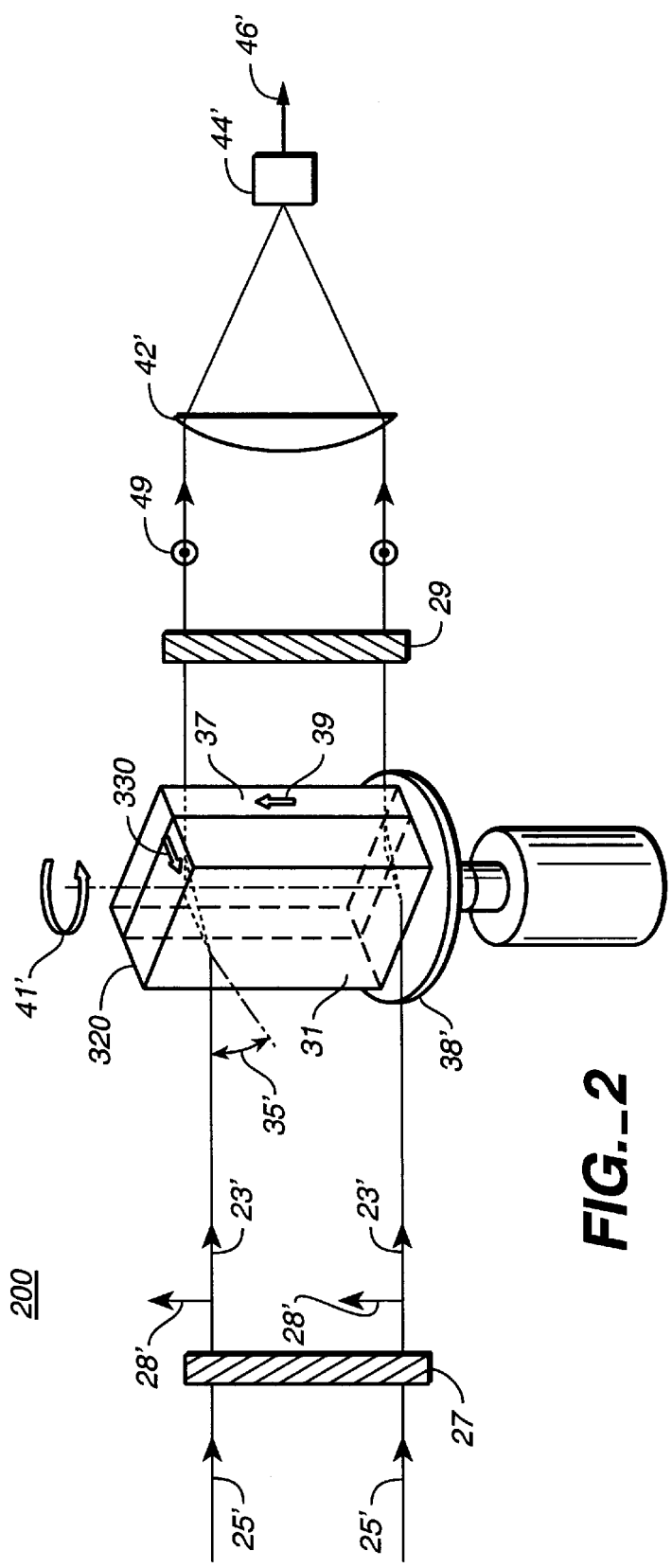
FIG._2

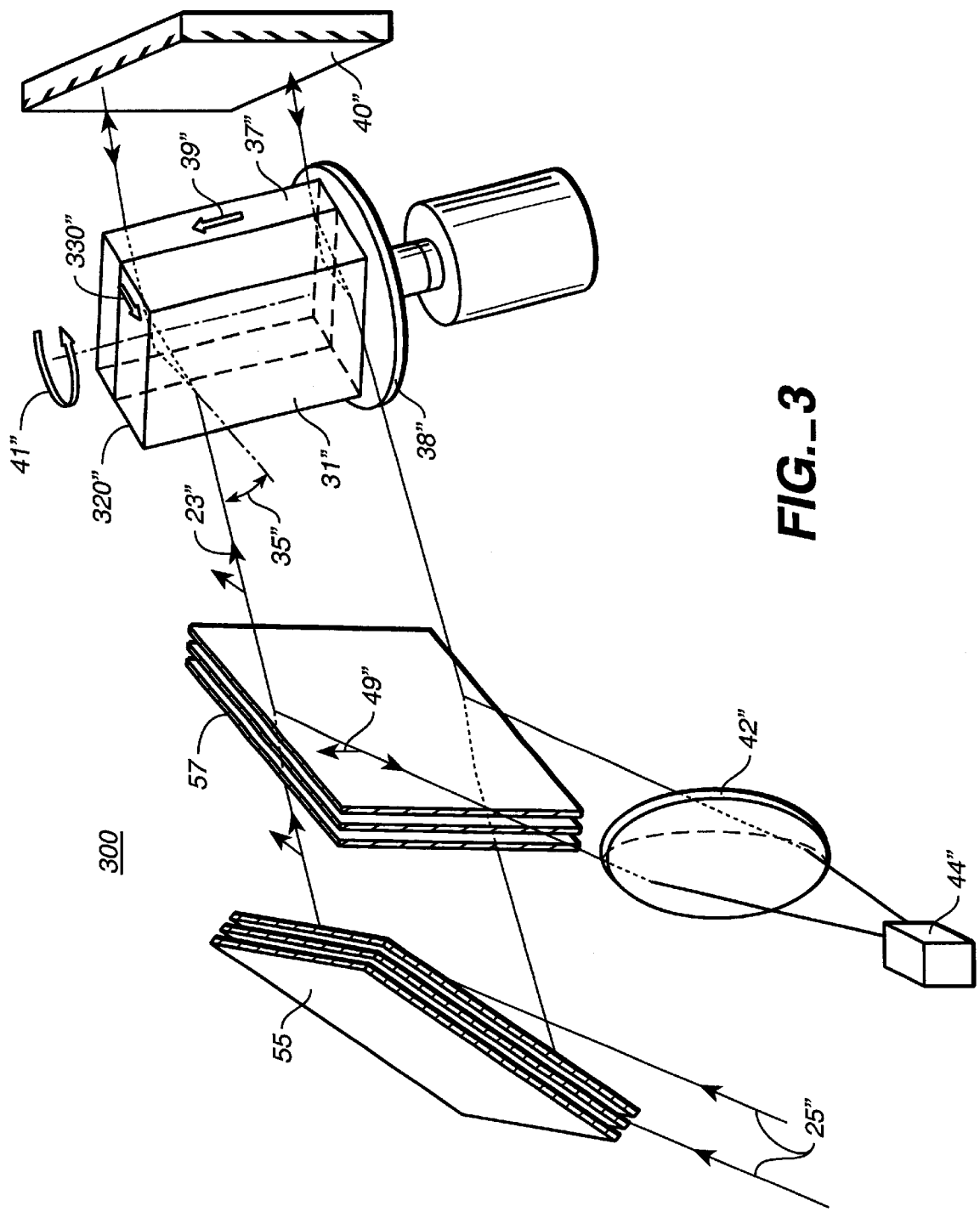
FIG._3

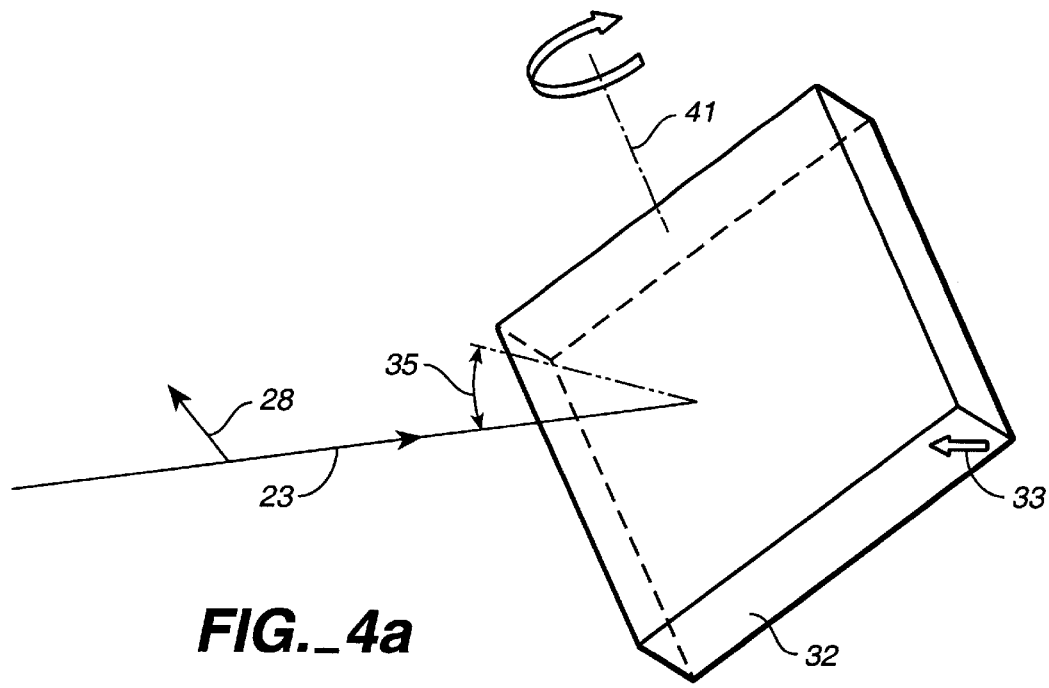
FIG._4a
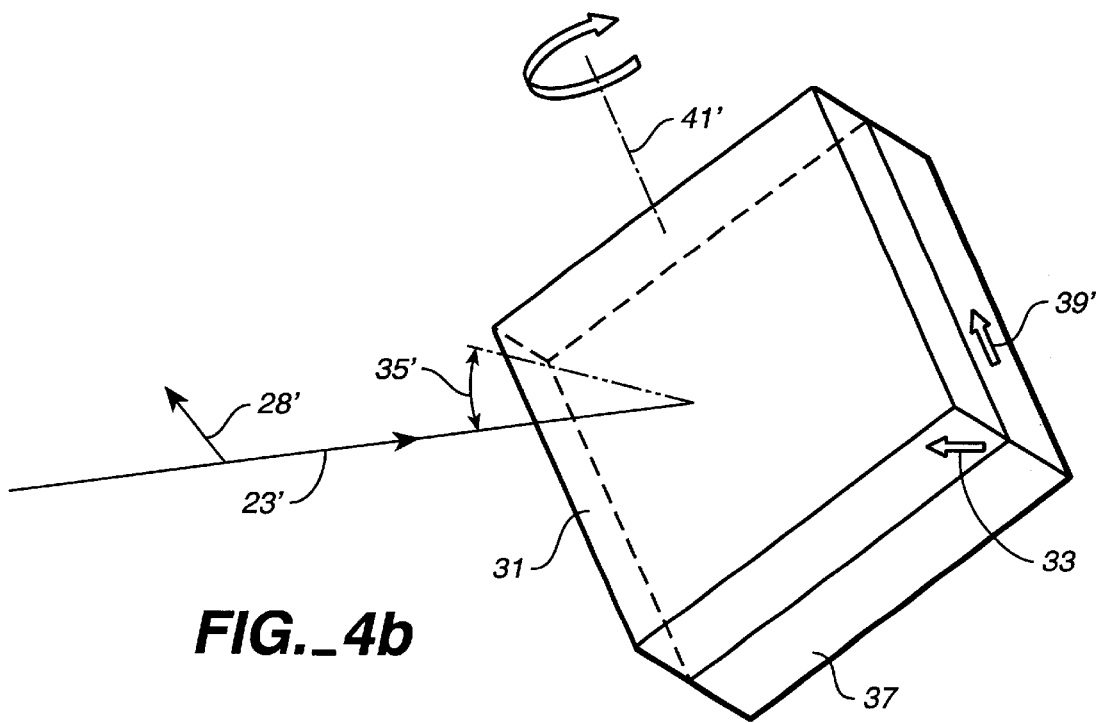
FIG._4b

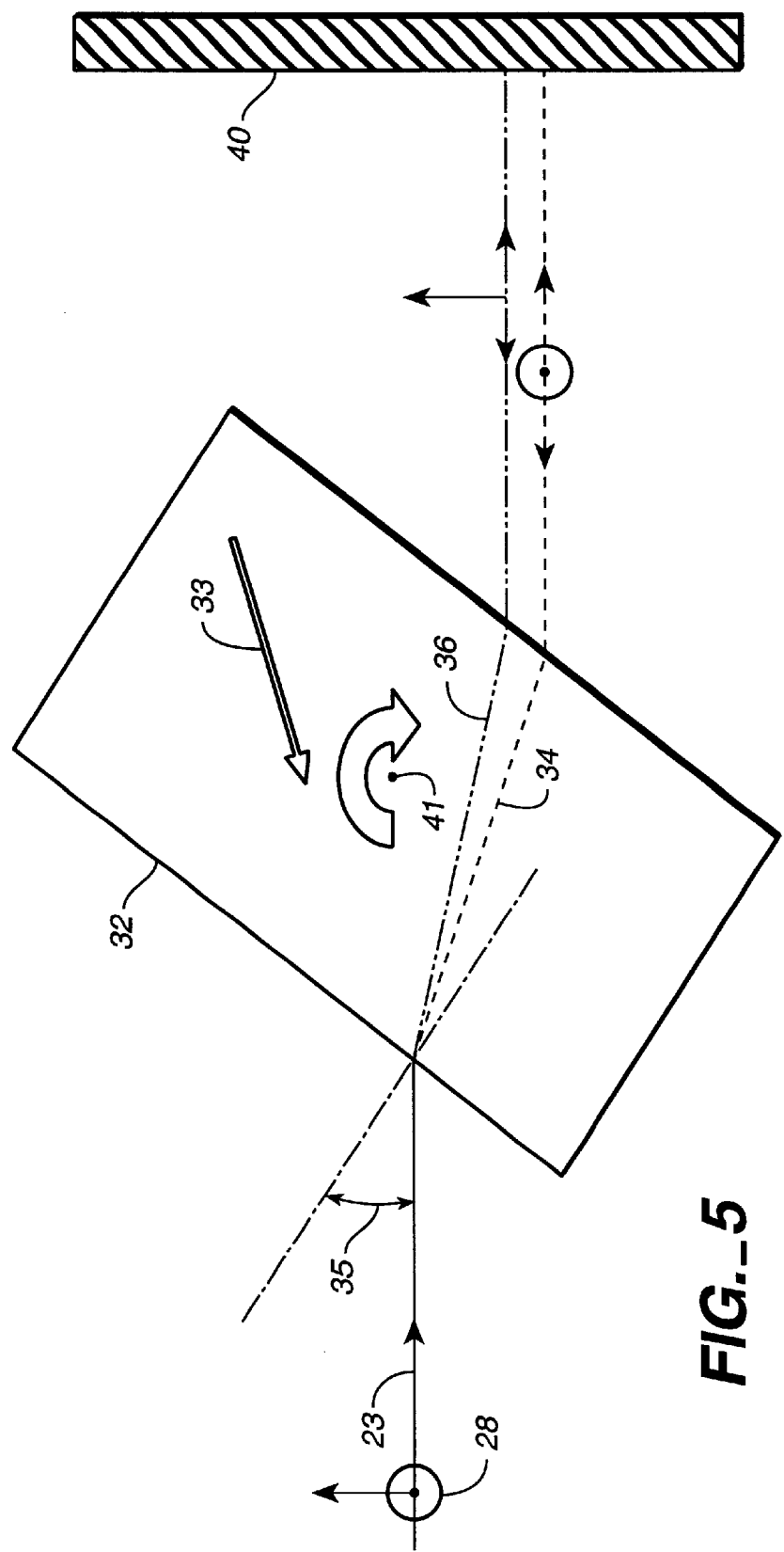
FIG._5

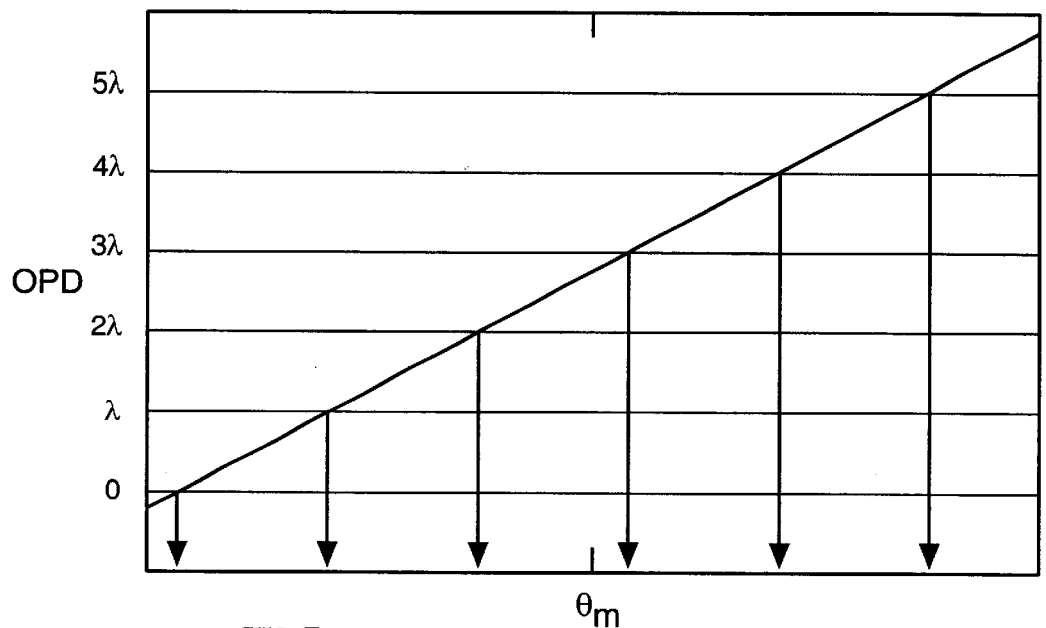
FIG._6a
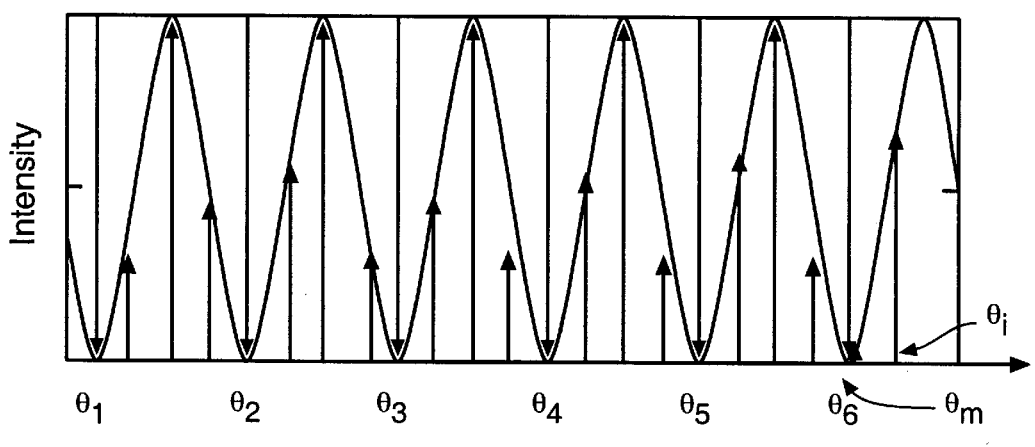
FIG._6b

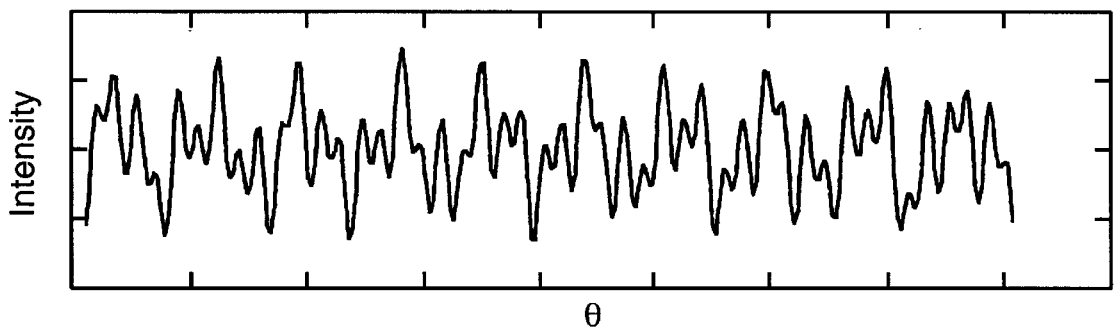
FIG._7a
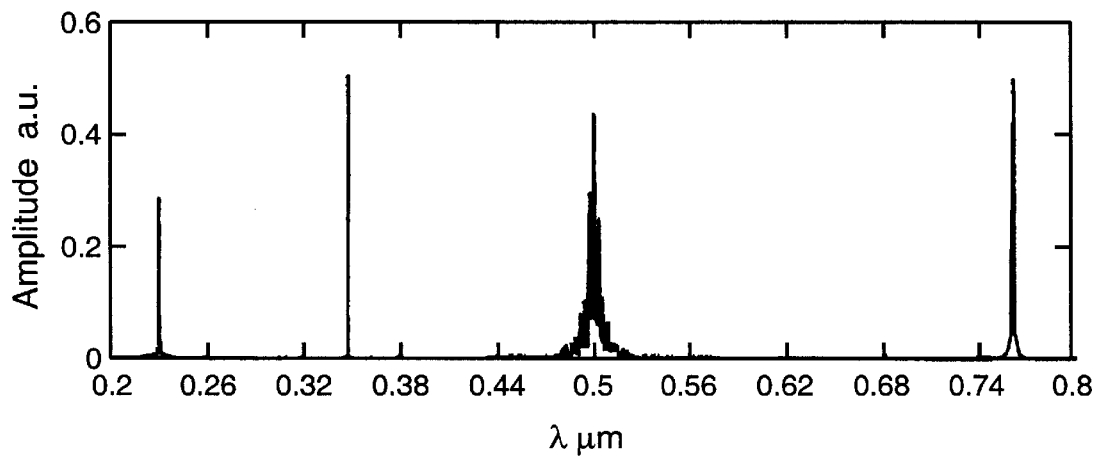
FIG._7b

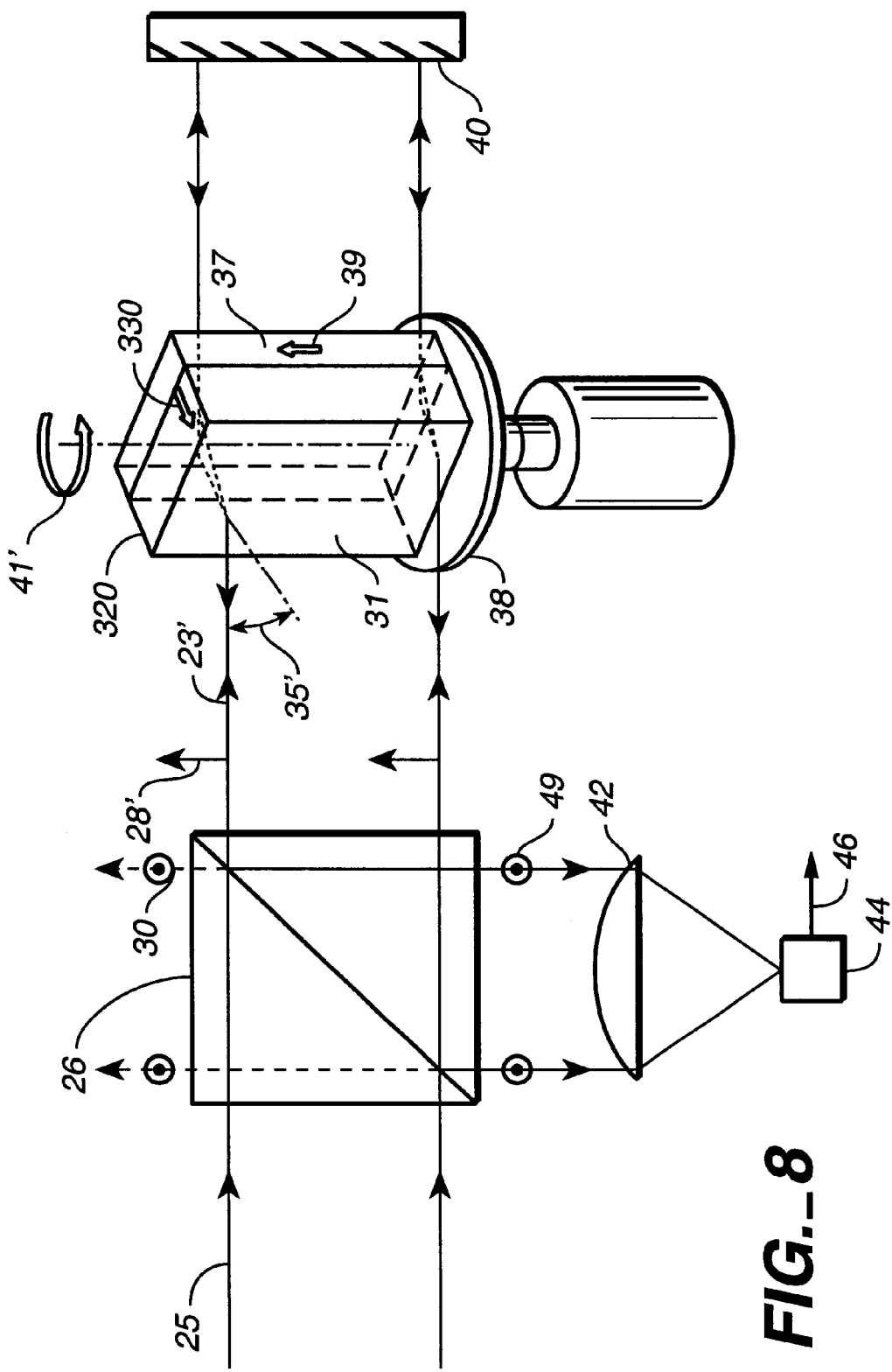
FIG._8

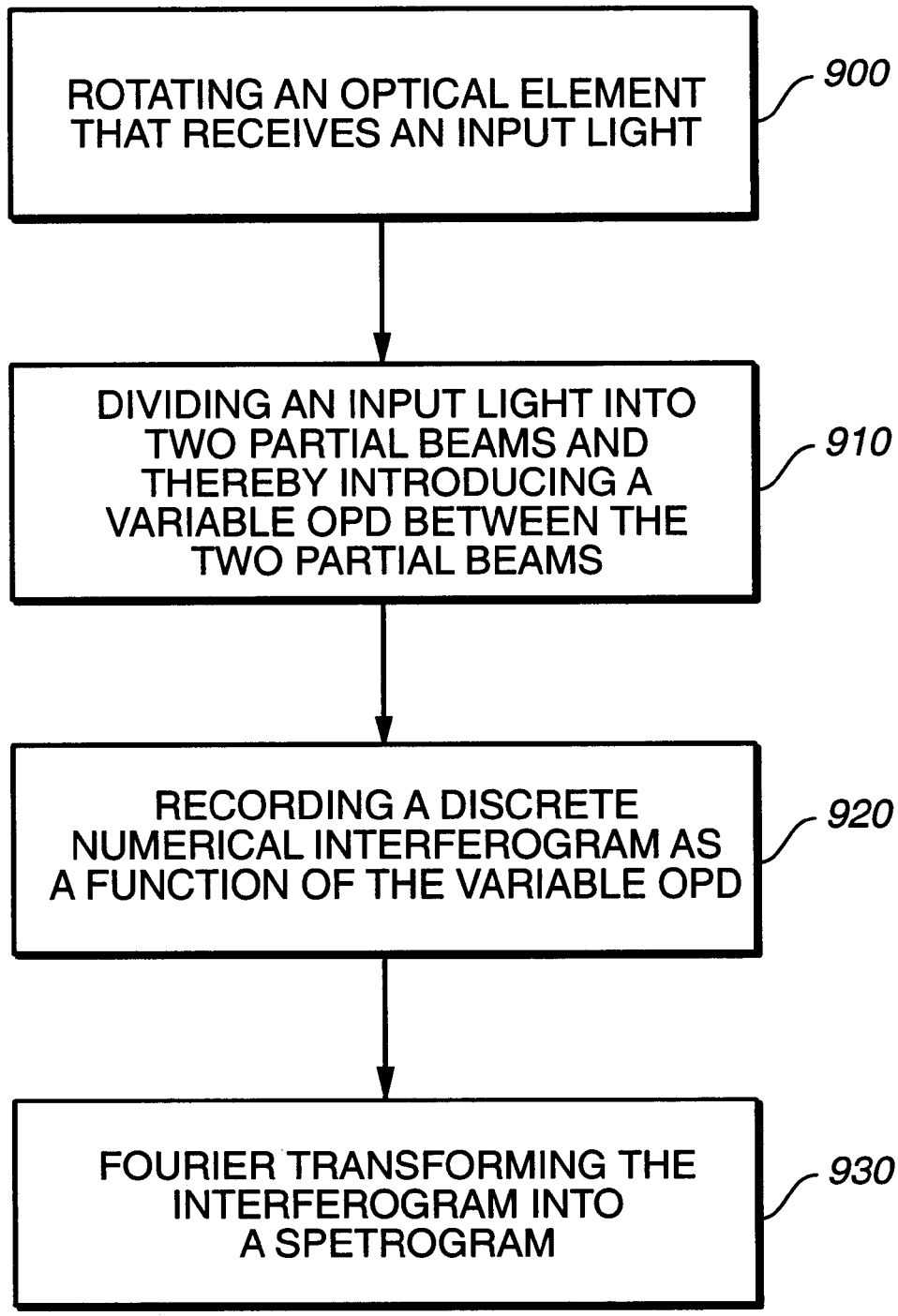
FIG._9

POLARIZATION INTERFEROMETER SPECTROMETER WITH ROTATABLE BIREFRINGENT ELEMENT

FIELD OF THE INVENTION

This invention relates to spectrometers and particularly to polarization interferometer spectrometers using Fourier transform.

BACKGROUND OF THE INVENTION

Conventional interferometer spectrometers are based on the idea of wavefront separation into two beams and introduction of an optical path difference (hereinafter "OPD") between such beams. The change in OPD causes modulation of light intensity due to interference between the two beams. Each optical wavelength present in the input light generates its own modulation frequency. Thus, the spectral content of the input light can be decoded by using Fourier transform (hereinafter "FT").

In conventional polarization interferometer spectrometers, an OPD is introduced between two rays with orthogonal polarization directions inside the double-refractive crystal. The waves corresponding to ordinary and extraordinary polarizations separate upon incidence on the crystal and travel with different velocities. After passing through the crystal, the rays exhibit a phase delay between them, which is proportional to crystal thickness. The two rays then interfere with each other after passing through a polarizing analyzer. The resulting intensity variations, which bear the signature of presented spectral components, are transformed or converted into an electrical signal by a photodetector. The electrical signal is thereby recorded for analysis.

To restore spectral components of the input light by using FT, the signal should be sampled at least twice of the frequency band of the interference signal. From the theory of FT, it follows that in order to resolve the optical wavelength $\lambda$ to the accuracy $\delta\lambda$, the total accumulated OPD $\Delta$ should satisfy the condition $\delta\lambda=\lambda^2/\Delta$. For example, if required resolution $\delta\lambda=0.5$ nm at $\lambda=500$ nm, then A =0.5 mm.

There are various known methods of generating OPD by means of double-refractive or birefringent crystals. One example is a Soleil compensator. The Soleil compensator comprises two complementing optical wedges and a plane-parallel plate, made of a double-refractive material, positioned at the normal incident angle. The optical axes of both wedges and the plate lay in the surface plane and are perpendicular to each other. When one of the wedges is sliding along the dividing diagonal face across the beam, an OPD is introduced between rays with orthogonal polarization directions. Examples of polarizing interferometer spectrometers utilizing this principal are disclosed in U.S. Pat. No. 3,849,001 issued to Inoue et al. and U.S. Pat. No. 5,157,458 issued to Wagner et al.

These polarization interferometer spectrometers have significant advantages in comparison to the ones based on a double-beam type interferometer such as a Michelson or Mach-Zehnder interferometer. One advantage comes from the fact that partial beams with orthogonal polarization directions share a common optical path. As a result imperfections of optical materials and surfaces as well as mechanical vibrations have significantly less influence on amplitude of the interference signal. This allows extending the useful range of polarization interferometer spectrometers into visible and near infrared wavelength ranges. However, these polarization interferometer spectrometers have their own technical limitations in practical applications due to their requirement that the traverse movement of the optical wedge must be highly stable and linear.

U.S. Pat. No. 5,781,293 issued to Padgett et al. (hereinafter "Padgett") describes an invention that overcomes the limitations associated with the above described polarization interferometer spectrometers. Padgett reveals a FT spectrometer that employs no moving parts. Padgett teaches that a double-wedge element made of a birefringent material such as a Wollaston prism may be used to introduce a variable OPD between rays with orthogonal polarization directions. The OPD is distributed linearly in a plane across an optical beam. An array of photosensitive elements placed across the beam captures the resulting spatial interference pattern, which uniquely corresponds to the spectral content of the input light. The pattern is analyzed by means of Fast Fourier transform (FFT). Again, the presence of the common optical path in this design significantly reduces effect of surface imperfections and mechanical vibrations and allows measurements to be taken in the ultra-violet, visible and near infrared regions. The absence of moving parts simplifies the design and reduces spectrum acquisition time to millisecond range.

However, the Padgett spectrometer also has technical limitations. For example, the dynamic range of an array of photosensitive elements is typically lower then that of a single photodetector, due to light scattering and current bleeding from the neighbor pixels. The number of elements in the array and spacing between them also put limit on the spectral resolution. Commercially available spectrometers of this type are known to have spectral resolution in the range of 100 cm$^{-1}$. That resolution may be insufficient for the majority of analytical and research applications.

Other conventional polarizing interferometers, primarily used for biological microscopy applications, utilize a slab of double-refractive material with its optical axes perpendicular to faces of the slab. Phase differences between ordinary and extraordinary rays are introduced by tilting the slab, and the OPD value is calculated from the tilting angle.

A common problem associated with polarizing interferometer spectrometers is the dependence of a material birefringence on wavelength of the input light. As a result, the OPD acquired for reference light would be different for some other spectral line. Because of that fact, the FFT algorithm is no longer applicable directly, and more general and slow digital FT algorithm is required for a high-resolution spectrum acquisition.

Another common limiting factor for the described interferometer spectrometers is a reduced throughput when such interferometer spectrometers are used in connection with a coupled optical fiber for delivering input light from a source. The cause of reduced light throughput is the dependence of refraction index from the angle of propagation in a double-refractive material. To maintain high fringes visibility, the phase variation $\delta\Delta$ over entire cone of collinated light should not exceed $\pi/4$. For example, if the shortest wave in the spectrum $\lambda=200$ nm, then $\delta\Delta \leq 50$ nm. As a result, to maintain synchronous phase variations across the beam, the light should be confined within small collimating angle. The product of the beam cross-section over acceptable light collimating angle defines the optical throughput or etendue of the system and is a limiting factor in the spectrometer throughput.

In summary, the known conventional designs of polarizing interferometer spectrometers with double-refractive elements, suffer from one or several of the following drawbacks: [1] low spectral resolution, [2] low dynamic range, [3] reduced optical throughput and [4] requirement for high stability of linear traverse stage.

Therefore, it is a general object of the present invention to provide an instrument and a method for determining the spectral content of the input light that address those above disadvantages.

It is another object of the present invention to provide an instrument that is portable or fits in a small size package.

It is another object of the present invention to provide an instrument that is simple and inexpensive to manufacture and thus is cost-effective.

SUMMARY OF THE INVENTION

Accordingly, the instrument of the present invention has a rotating optical element that separates an input light into two partial beams and thereby introduces a variable OPD between the partial beams. The instrument then records an interferogram as a function of the variable OPD and thereby Fourier or Fast Fourier transforms he interferogram into a spectrogram so that the spectral content of the input light is revealed.

In addition, the present invention also provides a method for determining spectral content of an input light. First, an optical element is rotated around a fixed rotational axis. Second, when the input light falls on the optical element, the input light is divided into two partial beams and thereby a variable optical path difference is introduced between the two partial beams. Third, a discrete numerical interferogram is recorded as a function of said variable optical path difference. And fourth, the discrete numerical interferogram is Fourier transformed into a spectrogram.

Additional objects, features and advantages of the present invention will become more apparent from the following description of its preferred embodiments, which description should be taken in conjunction with the accompanying drawings.

BRIEF DESCRIPTION OF THE DRAWINGS

FIG. 1 schematically illustrates an instrument with a fiberoptic input according to a first preferred embodiment of the present invention. The instrument utilizes a polarizing beamsplitter, a rotating optical element, and a mirror.

FIG. 2 shows a schematic drawing of a second preferred embodiment of the present invention with a collimated input light and two linear polarizers.

FIG. 3 illustrates a third preferred embodiment of the present invention, in which the polarizing beamsplitter of FIG. 1 is replaced by plates of optical material oriented at Brewster angle to the incident input light so that polarization of light in a broader spectral range is achieved.

FIG. 4a shows details of a first preferred embodiment of the optical element as illustrated in FIGS. 1–3. The optical element comprises a single plane-parallel plate FIG. 4b demonstrates a second preferred embodiment of the optical element constructed of two plane-parallel plates.

FIG. 5 schematically shows optical paths of ordinary and extraordinary rays inside the optical element.

FIG. 6a demonstrates graphical dependencies of acquired OPD between the ordinary and extraordinary rays from an incident angle.

FIG. 6b depicts a sample of an interference signal recorded during rotation of the optical element, corresponding to a reference monochromatic light.

FIG. 7a shows a sample of an interferogram corresponding to multiple wavelengths spectral input.

FIG. 7b demonstrates spectral components restored from the interferogram of FIG. 7a by means of interpolation and FFT.

FIG. 8 illustrates a fourth preferred embodiment of the present invention in which the instrument of FIG. 1 includes the optical element of FIG. 4b.

FIG. 9 is a flow chart showing steps of a method for determining spectral content of an input light.

DETAILED DESCRIPTION OF THE PREFERRED EMBODIMENTS

FIG. 1 schematically illustrates an instrument 100 such as a polarization interferometer spectrometer with a fiberoptic input 22 according to a first preferred embodiment of the present invention. Light under investigation is delivered from a source 20, e.g., glow plasma discharge, through the fiberoptic input 22 and is pre-collimated by means of a collimator 24 such as a lens or parabolic mirror. Pre-collimated incident light 25, being analyzed for its spectrum content, is polarized by means of a polarizing beamsplitter 26. The polarizing beamsplitter 26 divides the pre-collimated incident light 25 into a first light component and a second light component 23. The first beam component has a first polarization direction 30 and is reflected or absorbed while the second light component 23 has a second polarization direction 28 and is transmitted through. The polarization directions 28 and 30 are orthogonal to each other.

In addition, an optical element 32 of birefringent material such as calcite or KDP rotates around a rotational axis 41 oriented normally to the second light component 23 and tilted at approximately 45 degrees to the polarization direction 28. An optical axis 33 of the optical element 32 lays in a plane that is normal to the rotational axis 41. In this way the second light component 23 is always separated inside the optical element 32 into two partial light beams 34 and 36 of approximately equal intensity with orthogonal polarization directions corresponding to ordinary and extraordinary orientations.

Furthermore, the optical element 32 is mounted to a support platform 38 such as a stage or a table. Rotation of the optical element is provided by means of a rotator (not shown), e.g. a motor, that turns the support platform 38. Preferably, the motor continuously rotates the support platform 38 and thus turns the optical element 32 around the rotational axis 41 at a constant speed. Therefore, the problem of high stability and precision timing is addressed.

Due to the rotation of the optical element 32, an OPD is accumulated between the partial light beams 34 and 36 as a function of an incident angle 35. A mirror 40, preferably flat, is placed behind the rotating optical element 32 normal to the partial light beams 34 and 36. The introduction of the mirror 40 into the optical path provides several advantages. First, the partial light beams 34 and 36 incident on the rotating optical element 32 at a tilted angle and reflected from the mirror 40 have reduced variation of OPD inside a cone of incident angles. This significantly increases the throughput of the instrument 100. Second, the partial light beams 34 and 36 reflected from the mirror 40 have twice the accumulated OPD inside the optical element 32. This improves spectral resolution. And third, the reflection of the partial light beams 34 and 36 allow dual use of a single polarizing beamsplitter that functions as a polarizer and a analyzer. This reduces both the production cost and the size of the instrument 100. Thus, the instrument 100 is moderately priced, more compact and even portable.

In operation, the mirror 40 reflects the partial light beams 34 and 36 backward through the optical element 32 and onto the polarizing beamsplitter 26. The optical element 32 introduces an OPD between the partial beams 34 and 36 and thus rotates a polarization plane of a resulting beam formed from the combination of the partial light beams 34 and 36. Thereby, the polarizing beamsplitter 26 reflects third and fourth light components of the partial light beams 34 and 36 to a focusing element 42 such as a lens. In other words, the polarizing beamsplitter 26 extracts and then directs the third and fourth light components of the partial light beams 34 and 36 to a focusing element 42. The third and fourth components have a polarization direction 49 that is parallel to the first polarization direction 30. In other words, the polarization direction 49 is perpendicular to the second polarization direction 28.

Next, the focusing element 42 collects and directs the transmitted third and fourth light components with the polarization direction 49 onto a broadband photosensitive element 44 such as a photodiode, a photodetector, or a photomultiplier tube. The broadband photosensitive element 44 then transforms mutual interference components of the third and fourth components into an electrical signal 46. The electrical signal 46 is subsequently amplified by an amplifier 52, filtered by a filter 53, converted into digital format by an analog-to-digital converter 54 so as to form a discrete numerical interferogram. The discrete interferogram is preprocessed by a processor 56 and analyzed by means of a FT 58 to produce a spectro(gram 60 for display to observers or for other desired purposes.

Furthermore, a reference spectral line (hereinafter "RSL") from a source 48 is also introduced into the common optical path by means of a reflective interrupter 50. The RSL is also amplified by the amplifier 52, filtered by the filter 53, converted into digital format by the analog-to-digital converter 54, and recorded and pre-processed by the processor 56 prior to FT or FFT as further explained below. Alternatively, the RSL can be continuously monitored by a separate photodiode 45. In this alternative embodiment, an additional beamsplitter or fiber-optic input for delivering the RSL into the common optical path replaces the reflective interrupter 50. The RSL is redirected onto the separate photodiode 45 by means of a partial reflecting mirror 43 indicated by a dotted line and a bandpass filter 47. The output of the separate photodiode is then directed to the amplifier 52.

By having the RSL, the instrument 100 addresses potential problem associated with any nonlinearity in the dependence of accumulated OPD as a function of time. Such nonlinearity may exist because the substitution of the conventional double-refractive wedges with the continuously rotating optical element 32 of the present invention. Generally, nonlinearity does not allow direct application of well established method of FFT for the purpose of recovering spectral information.

Accordingly, the instrument 100 uses the RSL for recording nonlinear sequence of time samples corresponding to linear step changes of OPD. It can be achieved, for example, in such a manner that every null crossing of an interference signal produced by the RSL has a period corresponding exactly to $\lambda/2$ change in the OPD. The acquired timing sequence is later used to interpolate amplitude of an interference signal produced by the light under investigation. The newly calculated sequence of intensity values corresponds to linear accumulation of OPD. In the next step, the processor 56 can directly apply FT or FFT to find amplitudes of spectral components.

Furthermore, the RSL of the present invention also addresses any potential problem associated with dispersion of double-refractive material. The effect of dispersion causes additional nonlinearity in the accumulated OPD, which depends on the wavelength of the spectral component. As the result, during FFT only spectral components in the vicinity of the reference line are reproduced without distortion. The remaining wavelengths experience spectral broadening, which reduces resolution and distorts amplitude information. The present invention addresses the dispersion problem by sub-dividing the full spectral range into several bands, depending on resolution requirements, and performing separate FFT for each spectral band. The new timing sequences and corresponding new interpolated interference signal amplitude sequences are calculated from the performance of the virtual reference line in the center of the band. No additional measurement may actually be need during this process, because in most cases all the required information can be calculated from the calibration data, acquired with a single RSL, and the known dispersion formula of the birefringent material.

As one can see, the present invention is taking advantage of the increased processing power of modern computers. By simplifying the opto-mechanical design of conventional polarization interferometer spectrometers, more complicated processing and data analysis are delegated to the computer.

FIG. 2 shows an instrument 200 such as a polarization interferometer spectrometer that is a second preferred embodiment of the present invention. The instrument 200 is better suit for the analysis of the spectral content of the input light with low divergence such as starlight. In FIG. 2, reference characters with a prime affixed thereto indicate parts that are similar to those parts as illustrated in FIG. 1. The instrument 200 of FIG. 2 essentially differs from the instrument of FIG. 1 in two respects. First, the instrument 200 utilizes an optical element 320 that has two plane-parallel plates 31 and 37. And second, in place of the polarizing beamsplitter 26 of FIG. 1, the instrument 200 uses a linear polarizer 27 placed before and an analyzer 29 placed after the optical element 320.

The plate 31 has an optical axis 330 laying in the plane positioned at approximately 45 degrees to a polarization direction 28' of an incident light component 23' and normal to a rotational axis 41'. The second plate 37 has an optical axis 39 oriented in a plane parallel to the rotational axis 41'. A focusing element 42' is placed behind the analyzer 29 to focus light onto surface of a photodetector 44' that thereby converts intensity of the incident light into an electrical signal 46'. The composite optical element 320 finds its use in the majority of applications involving spectral analysis of the broadband light sources. Its design allows compensating wavelength dependence in the starting angular position corresponding to "zero" OPD and reducing nonlinearity, as shown in FIG. 5a.

The working spectral range of the instruments 100 and 200 is partly restricted by the operational band of polarizer, which is typically limited to a several hundred nanometers in ultra-violet, visible, and near infrared spectral ranges. Substituting the polarizing beamsplitter 26 of FIG. 1 or the polarizer 27 of FIG. 2 with stacked plates of optical material positioned under Brewster angle significantly extends the working spectral range as shown in and explained with respect to FIG. 3.

FIG. 3 shows an instrument 300 such as a polarization interferometer spectrometer 300 of the present invention.

Reference characters of FIG. 3 with a double prime affixed thereto indicate parts that are similar to those parts of FIGS. 1 and 2. FIG. 3 illustrates how the polarizing beamsplitter 26 of FIG. 1 can be replaced with first and second reflective polarizers 55 and 57. The first reflective polarizer 55 is constructed of a stack of plane-parallel plates made of optical material such as sapphire. The line normal to the plates surfaces form Brewster angle with the direction of a collimated light beam 25". The Brewster angle is determined by the formula of: $\tan((\theta_{Brewster}) = n_{material}$ where n is an index of material refraction. The portion of the s-polarization (normal to the incidence plane) component of the collimated light beam 25" is reflected from the first reflective polarizer 55 and is passing through the similar second reflective polarizer 57. The incident plane of the second reflective polarizer 57 is perpendicular to the incident plane of the first reflective polarizer 55, and the second reflective polarizer 57 is positioned at Brewster angle to the direction of incident light. In this arrangement, the polarization direction of the incident light 25" is a p-component (parallel to the incident plane) and passes through the first second reflective polarizer 57 with minimal losses. After completing a round trip through an optical element 320" with reflection from a mirror 40", the returning beam may experience rotation of polarization due to acquired phase delay in the same way as it was described in relation to FIG. 1. The s-component of the returning incident beam is partially reflected by the second reflective polarizer 57 and forms a ray with a polarization direction 49", which is focused by a focusing element 42" onto a photodetector 44". The first and second reflective polarizers 55 and 57 of FIG. 3 made of a stack of plane-parallel plates operate similar to the polarizing beamsplitter 26 of FIG. 1 while allow extending the working spectral range.

Preferably, the plates are made of sapphire or fused silica. For example, plane-parallel sapphire plates oriented at approximately 61 degrees incidence angle partially reflect s-polarization while passing through p-polarization. A stack of sapphire plates may be used as an efficient reflective polarizer in the spectral range of 200 to 1500 nm. Slight variation of Brewster angle due to material dispersion may reduce actual polarization purity at the ends of the range. In this particular arrangement, optical axis of the sapphire plate should be oriented at approximately 29 degrees to the surface normal and lay in the incidence plane. Such orientation allows suppressing undesirable rotation of the polarization plane due to sapphire birefringence. Only portion of the optical path related to reflective polarization of a collimated beam 25" is shown as illustration on FIG. 3.

FIG. 4a shows a detailed drawing of the optical element 32 of FIG. 1. Thus, reference characters of FIG. 1 are used. The optical axis 33 of the optical element 32 lays in a plane that is normal to the rotational axis 41. Alternatively, the optical element 32 may also comprise many adjacent slabs of birefringent material, which adjacent slabs all have an optical axis laying in a plane that is perpendicular to the rotational axis 41.

FIG. 4b shows a detailed drawing of the optical element 320 of FIG. 2. Thus, reference characters of FIG. 2 are used. The optical element 320 is constructed of the two plane-parallel plates 31 and 37. When the two plates 31 and 37 are attached together in such a way that the optical axis 330 of the plate 31 lays in the plane normal to the rotational axis 41 and the optical axis 39 of the other plate 37 lays in the plane parallel to the rotational axis 41, the extraordinary and ordinary rays switch places at the interface between the plates 31 and 37. As the result, the OPD accumulating between the two rays reverse sign. For example, if the OPD was increasing during propagation in the first plate 31, it starts decreasing in the second plate 37. The index of refraction of the extraordinary ray depends from the angle of propagation of the ray inside the crystal given by the following equation:

$$n_1(\theta,\lambda,b) = \{[n_e(\lambda)^2 \cdot n_o(\lambda)^2]/\{[_e(\lambda) \cdot \cos(b-\theta)]^2 + [n_o(\lambda) \cdot \sin(b-\theta)]^2\}\}^{-2}$$

where b– is an offset angle between normal to the crystal surface and direction of the optical axis. It is possible to select design thickness for the two plates 31 and 37 in such a way that after passing through the composite optical element at the particular incidence angle, the OPD between ordinary and extraordinary rays is null. This incidence angle becomes a reference "zero" point for recorded interferogram and is used for the subsequent FT or FFT analysis.

Furthermore, the first plate 31 may comprise many adjacent slabs of birefringent material, which adjacent slabs all have an optical axis laying in a plane that is perpendicular to the rotational axis 41. Similarly, the second plate 37 may also comprise many adjacent slabs of birefringent material, which adjacent slabs all have an optical axis laying in a plane that is parallel to the rotational axis 41.

Note that interferometer 100, 200, and 300 can function with the first embodiment of the optical element as illustrated by FIG. 4a or with the second embodiment of the optical element as illustrated by FIG. 4b.

FIG. 5 shows an example of optical paths of the ordinary 34 and extraordinary 36 partial light beams of FIG. 1 inside the optical element 32 before and after reflection from the mirror 40. Reference characters of FIG. 1 are used. Inside the optical element 32, the second light component 23 with the polarization direction 28 oriented at approximately 45 degrees to the rotational axis 41 separates into the ordinary partial light beam 34 and the extraordinary partial light beam 36, which travel under diverging angle with different speeds. Upon exit from the optical element 32, the partial beams 34 and 36 travel substantially along the original direction but are spatially separated. After reflection from the auto-collimated mirror 40, the partial light beams travel backward through the optical element 32. The OPD accumulated during double pass through the optical element 32 produces a phase shift between the partial light beams with o- and e-polarization. If the spectral line with the wavelength A is present in the input light the intensity of the interference signal after polarizing reflection will be at its minimum when the OPD is equal to m*λ, where m=0, 1, 2 . . . , and at its maximum when the OPD=(m+½)·λ. During rotation of the optical element 32, the output electrical signal 46 oscillates between minimum and maximum. Each spectral line present in the input light will produce its own oscillation signature. The optical axis 33 of the optical element 32 lays preferably in the plane normal to the rotational axis 41.

FIG. 6a demonstrates an example of graphical dependence of the acquired OPD between ordinary and extraordinary partial beams as a function of the incident angle θ with respect to an instrument of the present invention utilizing the optical element 320 of FIG. 4b. The equally spaced horizontal lines represent values of accumulated OPD steps m×λ. The drop-down vertical lines illustrate matching incident angles $\theta_m$. The related FIG. 6b depicts sample of an interference signal corresponding to the reference monochromatic light recorded during rotation of the optical element. The period of oscillations of the reference signal serve as equal step marks of acquired OPD. Typically, values $\theta_m$ are not equally spaced, which is manifestation of the fact that the acquired OPD is nonlinear function of rotation angle. On the other hand, the intensity of the interference signal is measured with an equal time sampling rate. The timing marks are directly proportional to rotation angle marks indicated as $\theta_i$ on FIG. 6b, and corresponding signal amplitudes are designated by smaller arrows. In order to recover the spectral components of the light under investigation by the method of FFT, the interference signal should be acquired at equal OPD steps. For that purpose, the amplitudes of the interference signal measured at angular positions $\theta_i$ are used later to interpolate amplitudes at angles $\theta_m$. It is made under conditions that the distance between any two adjusting angular marks $\theta_i$ is always less then half-period of oscillations corresponding to the shortest wavelength in the spectrum. The newly calculated sequence of amplitude values corresponds to linear accumulation of OPD. In the next step direct FFT is applied to find amplitudes of spectral components.

The recorded intensity of interference signal generated by multiple spectral lines is shown on FIG. 7a. From here, the input spectral components shown on the FIG. 7b are restored by means of FFT.

FIG. 8 illustrates a fourth preferred embodiment of the present invention in which the instrument 100 of FIG. 1 includes the optical element 320 of FIG. 4b. Thus, reference characters of FIGS. 1 and 4b are used.

FIG. 9 is a flow chart of a method for determining spectral content of an input light. In step 900, an optical element is rotated around a fixed rotational axis and thereby receives the input light. Preferably, the input light is substantially collimated and polarized. In step 910, the input light is divided into two partial beams and thereby a variable optical path difference is introduced between the two partial beams. In step 920, a discrete numerical interferogram is recorded as a function of said variable optical path difference. And in step 930, the discrete numerical interferogram is Fourier transformed into a spectrogram. Preferably, FFT is used to transform the discrete numerical interferogram into a spectrogram.

The foregoing description of several embodiments of the invention and examples discussed has been presented for the purpose of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

I claim:

1. An instrument for determining spectral content of an input light, comprising:
   a rotatable optical element, wherein said input light falls on an optical surface of said optical element and is separated into two partial beams, and said optical element thereby introduces a variable optical path difference between said two partial beams of said input light; and
   a processor, said processor Fourier transforming an interferogram into a spectrogram, wherein said interferogram is recorded as a function of said variable optical path difference between said two partial beams of said input light.

2. The instrument of claim 1 further comprises a rotator for turning said optical element around a rotational fixed axis.

3. The instrument of claim 2, wherein said rotational axis forms a substantially 45 degrees angle with a polarization plane of said input light and is substantially parallel to said optical surface.

4. The instrument of claim 2, wherein said optical element comprises a first slab of birefringent material, said first slab having an optical axis that is substantially normal to said rotational axis.

5. The instrument of claim 4, wherein said optical element further comprises a second slab of birefringent material adjacent to said first slab, said second slab having an optical axis that is substantially parallel to said rotational axis.

6. The instrument of claim 1, wherein said input light includes a reference signal of monochromatic light and is used by said processor to Fourier transform said interferogram into a spectrogram.

7. The instrument of claim 6, wherein said processor Fast Fourier transforms said interferogram into a spectrogram.

8. The instrument of claim 1 further comprises a collimator that substantially collimates said input light and a polarizer that thereby polarizes said substantially collimated input light.

9. An instrument for determining spectral content of input light, comprising:
   a collimator, said collimator converting said input light into substantially collimated light;
   a polarizing beamsplitter, said polarizing beamsplitter dividing said collimated light into first and second components having respective first and second polarization directions that are orthogonal, wherein said first polarized component is reflected while said second polarized component is transmitted through;
   a rotatable optical element, said optical element separating said second polarized component into two partial beams with orthogonal polarization directions and thereby introducing a variable optical path difference between said two partial beams;
   a mirror placed at normal incident angle to said two partial beams, said mirror reflecting said two partial beams that thereby travel backward through said double-reflective element and re-enters said polarizing beamsplitter, wherein said polarizing beamsplitter extracts third and fourth components of said two partial beams, and said third and fourth components have a polarization direction that is perpendicular to said second polarization direction;
   an optical collector, said optical collector gathering and thereby directing said third and fourth components to a signal converter, said signal converter transforming mutual interference components of said third and fourth components into a discrete numerical interferogram; and
   a processor, said processor Fourier transforming said discrete numerical interferogram into a spectrogram.

10. The instrument of claim 9, further comprises a rotator for turning said optical element around a fixed rotational axis that forms a substantially 45 degrees angle with a polarization plane of said polarized collimated light.

11. The instrument of claim 10, wherein said optical element comprises a first slab of birefringent material, said first slab having an optical surface and an optical axis, wherein said optical surface receives said polarized collimated light and is substantially parallel to said rotational axis while said optical axis is substantially normal to said rotational axis.

12. The instrument of claim 11, wherein said optical element further comprises a second slab of birefringent material adjacent to said first slab, said second slab having an optical axis that is substantially parallel to said rotational axis.

13. The instrument of claim 9, wherein said optical collector is a focusing lens, and said signal converter comprises a photodetector, an amplifier, a filter, and an analog-to-digital converter.

14. The instrument of claim 10, wherein said input light includes a reference signal of monochromatic light, and wherein said reference signal is collected by said optical collector and is used by said processor to Fourier transform said discrete numerical interferogram into a spectrogram.

15. The instrument of claim 14, wherein said processor Fast Fourier transforms said discrete numerical interferogram into a spectrogram.

16. An instrument for determining spectral content of an input light, comprising:
   a collimator, said collimator converting said input light into substantially collimated light;
   a first polarizer, said first polarizer polarizing said collimated light;
   a rotatable optical element, said optical element separating said polarized collimated light into two partial beams with orthogonal polarization directions and thereby introducing a variable optical path difference between said two partial beams;
   a second polarizer, said second polarizer extracts components of said two partial beams that are polarized in one direction;
   an optical collector, said optical collector gathering and thereby directing said components to a signal converter, said signal converter transforming mutual interference components of said components into a discrete numerical interferogram; and
   a processor, said processor Fourier transforming said discrete numerical interferogram into a spectrogram.

17. The instrument of claim 16, further comprises a rotator for turning said optical element around a fixed rotational axis, wherein said rotational axis forms a substantially 45 degrees angle with a polarization plane of said collimated light.

18. The instrument of claim 17, wherein said optical element comprises a first slab of birefringent material, said first slab having an optical surface and an optical axis, wherein said optical surface receives said polarized collimated light and is substantially parallel to said rotational axis while said optical axis is substantially normal to said rotational axis.

19. The instrument of claim 18, wherein said optical element further comprises a second slab of birefringent material adjacent to said first slab, said second slab having an optical axis that is substantially parallel to said rotational axis.

20. The instrument of claim 16, wherein said optical collector is a focusing lens, and said signal converter comprises a photodetector, an amplifier, a filter, and an analog-to-digital converter.

21. The instrument of claim 16, wherein said input light includes a reference signal of monochromatic light, and wherein said reference signal is gathered by said optical collector and is used by said processor to Fourier transform said discrete numerical interferogram into a spectrogram.

22. The instrument of claim 21, wherein said processor Fast Fourier transforms said discrete numerical interferogram into a spectrogram.

23. A method for determining spectral content of an input light that is substantially collimated and polarized, comprising steps of:
   rotating an optical element around a fixed rotational axis, wherein said input light falls on said optical element;
   dividing said input light into two partial beams and thereby introducing a variable optical path difference between said two partial beams;
   recording a discrete numerical interferogram as a function of said variable optical path difference; and
   Fourier transforming said discrete numerical interferogram into a spectrogram.

24. The method of claim 23, wherein said optical element comprises a first slab of birefringent material, said first slab having an optical surface and an optical axis, and wherein said optical surface receives said input light and is substantially parallel to said rotational axis, said optical axis is substantially normal to said rotational axis, and said rotational axis forms a substantially 45 degrees angle with a polarization plane of said polarized collimated light.

25. The method of claim 24, wherein said optical element further comprises a second slab of birefringent material adjacent to said first slab, said second slab having an optical axis that is substantially parallel to said rotational axis.

26. The method of claim 23, wherein said input light includes a reference signal of monochromatic light, and said step of Fourier transforming includes Fourier transforming said discrete numerical interferogram into a spectrogram using said reference signal.

27. The method of claim 23, wherein said input light includes a reference signal of monochromatic light, and said step of Fourier transforming includes Fast Fourier transforming said discrete numerical interferogram into a spectrogram using said reference signal.

28. A method for determining spectral content of an input light, comprising steps of:
   collimating said input light;
   polarizing said collimated light, wherein a first component of said polarized collimated light is transmitted through;
   dividing said transmitted first component into two partial beams with orthogonal polarization directions and thereby introducing a variable optical path difference between said two partial beams via an optical element that rotates around a fixed rotational axis;
   extracting second and third components of said two partial beams;
   converting mutual interference components of said second and third components into a discrete numerical interferogram; and
   Fourier transforming said discrete numerical interferogram into a spectrogram.

29. The method of claim 28, wherein said optical element comprises a first slab of birefringent material, said first slab having an optical surface and an optical axis, and wherein said optical surface receives said input light and is substantially parallel to said rotational axis, said optical axis is substantially normal to said rotational axis, and said rotational axis forms a substantially 45 degrees angle with a polarization plane of said polarized collimated light.

30. The method of claim 29, wherein said optical element further comprises a second slab of birefringent material adjacent to said first slab, said second slab having an optical axis that is substantially parallel to said rotational axis.

31. The method of claim 28, wherein said first, second, and third components are polarized in a one direction.

32. The method of claim 28, further comprises a step of reflecting between said step of dividing and said step of extracting, wherein said step of reflecting includes reflecting said two partial beams backward through said optical element.

33. The method according to claim 31 or 32, wherein said first component polarizes in a first direction, said second and third components are polarized in a second direction, and said first and second directions are perpendicular.

34. The method of claim 28, wherein said input light includes a reference signal of monochromatic light, and said step of Fourier transforming includes Fourier transforming said discrete numerical interferogram into a spectrogram using said reference signal.

35. The method of claim 28, wherein said input light includes a reference signal of monochromatic light, and said step of Fourier transforming includes Fast Fourier transforming said discrete numerical interferogram into a spectrogram using said reference signal.

36. An instrument for introducing a variable optical path difference between partial beams of an input light that is substantially collimated and polarized, comprising:

a rotator;

an optical element coupled to said rotator, wherein said rotator rotates said optical element around a fixed rotational axis, said input light falls on an optical surface of said optical element, and said optical element separates said input light into two partial beams and thereby introduces a variable optical path difference between said two partial beams.

37. The instrument of claim 36, wherein said fixed rotational axis forms a substantially 45 degrees angle with a polarization plane of said input light and is substantially parallel to said optical surface.

38. The instrument of claim 36, wherein said optical element comprises a first slab of birefringent material, said first slab having an optical axis that is substantially normal to said rotational axis.

39. The instrument of claim 38, wherein said optical element further comprises a second slab of birefringent material adjacent to said first slab, said second slab having an optical axis that is substantially parallel to said rotational axis.

* * * * *